W. A. GIBSON.
AIR CONTROLLING ATTACHMENT FOR CARBURETERS.
APPLICATION FILED SEPT. 25, 1917.
1,323,044.  Patented Nov. 25, 1919.
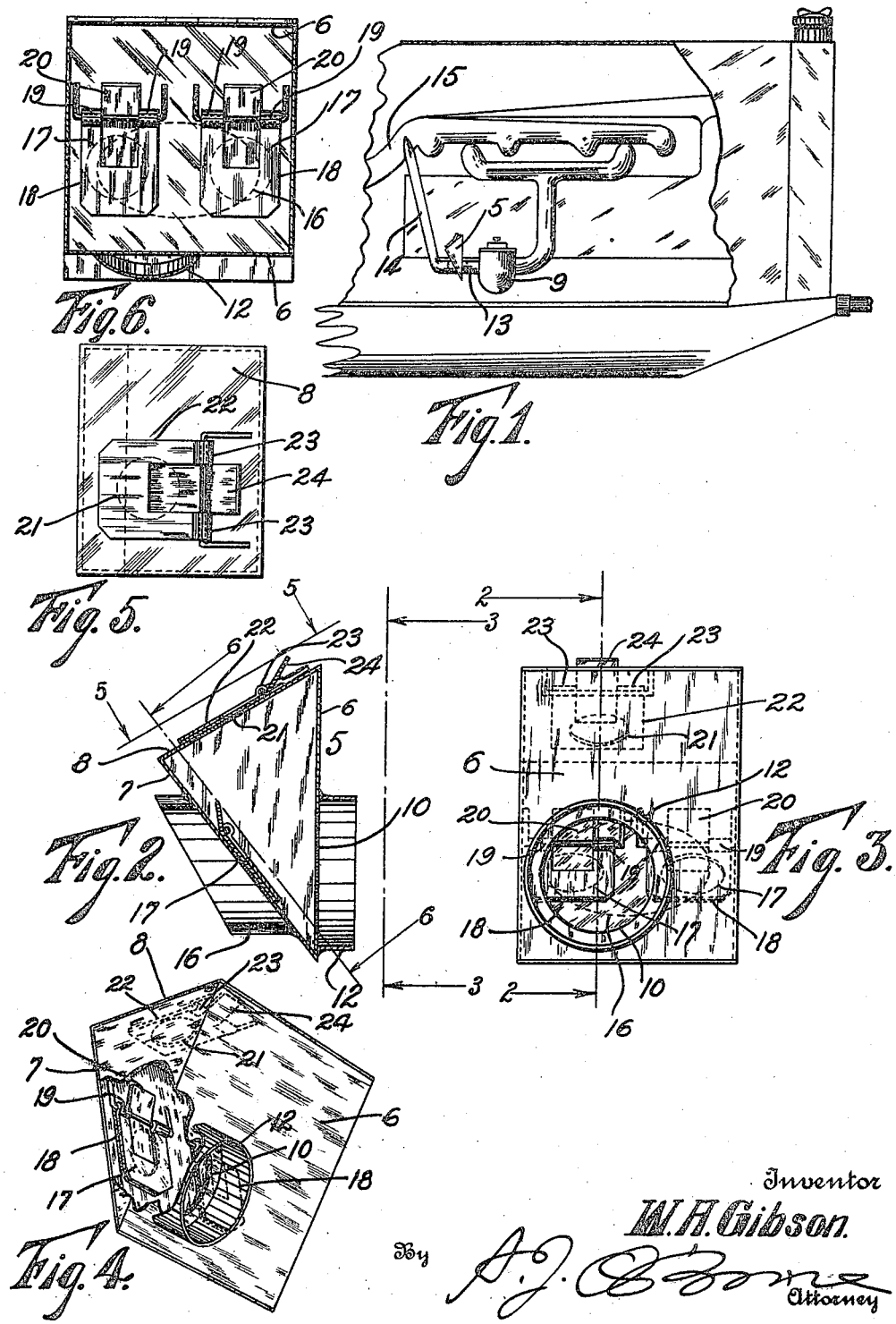
Inventor
W. A. Gibson.
By
Attorney

UNITED STATES PATENT OFFICE.

WILLIAM A. GIBSON, OF DENVER, COLORADO.

AIR-CONTROLLING ATTACHMENT FOR CARBURETERS.

1,323,044.

Specification of Letters Patent.    Patented Nov. 25, 1919.

Application filed September 25, 1917. Serial No. 193,095.

*To all whom it may concern:*

Be it known that I, WILLIAM A. GIBSON, a citizen of the United States, residing in the city and county of Denver and State of Colorado, have invented certain new and useful Improvements in Air - Controlling Attachments for Carbureters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for controlling the passage of air to carbureters, being more especially intended for use in connection with the branch pipe or conduit for supplying hot air to carbureters of the class in which this air is taken from the exhaust manifold of the engine.

This device consists specifically of a hollow member connected with the said hot air pipe or conduit, the said member having three sides, one of which is on the carbureter side and is provided with an opening in communication with the conduit. The second side is also provided with one or more openings which are in communication with the conduit on the side opposite the carbureter while the third side is provided with an opening in communication with the atmosphere. The openings in the second side of the hollow member are controlled by normally closed, gravity operated, inwardly opening, check valves, while the opening in the third side of the hollow member is controlled by a normally closed gravity operated, outwardly opening check valve, the valve or valves for controlling the opening or openings in the second side of the said member regulating the inlet of hot air to the carbureter, while the function of the outwardly opening check valve on the third side of this member is to relieve excess pressure due to back firing, said pressure escaping through the opening controlled by this valve. The second and third sides of the hollow member are positioned to maintain their respective check valves normally closed and under the influence of gravity, as heretofore explained.

Having briefly outlined my improvement, I will proceed to describe the same in detail, reference being made to the accompanying drawing in which is illustrated an embodiment thereof.

In this drawing:

Figure 1 is a fragmentary view of the forward extremity of an automobile with the hood partly broken away to expose the engine on the carbureter side, my improvement being shown in place.

Fig. 2 is a detail sectional view, taken on the line 2—2, Fig. 3, shown on a much larger scale, being approximately full size.

Fig. 3 is an elevation of the device looking in the direction of the arrows adjacent the line 3—3, Fig. 2.

Fig. 4 is a perspective view of the device partly broken away.

Fig. 5 is an elevation of the device looking in the direction of arrows 5, Fig. 2.

Fig. 6 is a section taken on the line 6—6, Fig. 2, viewed in the direction of the arrows.

The same reference characters indicate the same parts in all the views.

Let the numeral 5 designate my improved device considered in its entirety, and as illustrated in the drawing being triangular in shape in side view, and having three sides respectively designated by the numerals 6, 7 and 8. The side 6 of the hollow member is vertically disposed and turned toward the carbureter 9 of the engine. This side is provided with an opening 10, which is surrounded by a collar 12 which is fitted into or operatively connected with, in any suitable manner, the part 13 of the hot air pipe 14 which connects the exhaust manifold 15 with the carbureter. In other words, my improved device is connected with the hot air conduit by dividing the latter between its extremities and preferably near the carbureter, and inserting the device therein, the collar 12 being connected with the hot air pipe member on the carbureter side while a collar 16 on the opposite side is connected with the other member of the hot air conduit. Hence, the opening 10 in the side 6 is in direct communication with the carbureter. The opposite side 7 as illustrated in the drawing is provided with two openings 17 both of which are in communication with the hot air conduit by way of the collar 16. This side 7 of the device is inclined to the vertical sufficiently to maintain gravity operated valves 18 in position to close their respective openings 17. Each of these check valves, as illustrated in the drawing, consists of a plate whose upper edge is hinged, as shown at 19, to the inner surface of the side wall 7 and in such a manner that it opens inwardly, the upper edge of the check valve having a lip 20 which extends slightly inwardly from the adjacent surface of the wall, the angle of the lip with the body of the valve being such as to permit the valve to open the necessary distance, but at the same time limiting the opening movement. As heretofore stated, each of these valves is normally closed. They open, however, in response to the suction of the engine and in actual practice have a sort of floating action constantly moving back and forth adjacent their respective openings and in this way properly and automatically controlling the air inlet to the carbureter in such a manner that the explosive mixture is properly tempered or oxidized, while at the same time such an excess of air as would unduly dilute the mixture is obviated. The side 8 of the hollow member is uppermost and provided with an opening 21 which is normally closed by an outwardly opening check valve 22 which is hinged at 23 and provided with a lip 24 which forms such an angle with the body of the valve that it limits the opening movement of the latter. The side 8 of the device is so positioned that the outwardly opening check valve 22 is normally held in the closed position, both by gravity and by the partial vacuum produced in the hollow member by the engine suction. This valve, however, opens in response to the back firing force of the engine and thus prevents injury to any part of the structure by reason of such force.

From the foregoing description, the use and operation of my improvement will be readily understood. The device being interposed in the hot air pipe between the two members 13 and 14 thereof, when the engine is in operation the resulting suction opens the normally closed check valves 18 and allows the necessary hot air to enter the carbureter from the exhaust manifold, the said valves vibrating in such a manner as to properly control the entrance of air, their maximum opening movement, however, being limited by the lips 20 of the valves, which are properly arranged for that purpose, as heretofore explained. I have illustrated in the drawing two of these check valves, but it is believed that one will answer the purpose or that more than two may be employed if desired. In my demonstrations I have obtained the best results by employing two, but it should be understood that the invention is not limited to the specific disclosure as set forth in the drawing and description except as defined by the appended claims.

The check valve 22 opens outwardly and is normally closed by gravity by virtue of the peculiar inclination of the wall or side 8 of the hollow member. Hence, the suction of the engine, whereby a partial vacuum is produced, has a tendency to maintain this valve in the tightly closed position. However, in the event that back firing occurs this valve opens outwardly and prevents injury to any part of the structure.

Having thus described my invention, what I claim is:

1. An air controlling attachment for carbureters comprising a hollow member connected with the air supply conduit of the carbureter and having three sides, the first of which has an opening in communication with the conduit on the carbureter side, the second of which has an opening in communication with the conduit on the opposite side, while the third has an opening communicating with the atmosphere, the second and third sides carrying gravity operated check valves and having an angle with the vertical of such a degree that the valves will not be moved by movements of the vehicle on which the device is used, whereby the said valves normally close said openings, the valves opening respectively inwardly and outwardly, the valves being freely mounted so as to be closed solely by force of gravity.

2. An air controlling attachment for carbureters having a hot air pipe connection with the exhaust manifold, comprising a hollow member triangular in cross section, the first side having an opening in communication with the carbureter, the second side having an opening in communication with the hot air pipe and controlled by a normally closed, gravity operated, inwardly opening check valve, while the third side has an opening controlled by a gravity operated, normally closed, outwardly opening check valve, each of said check valves having means for limiting its opening movement and preventing its remaining open, said second and third sides being at an angle to the vertical of a degree such that said valves will not be opened by movements of the vehicle on which the device is used.

In testimony whereof I affix my signature.

WILLIAM A. GIBSON.